US006282491B1

(12) United States Patent
Bochmann et al.

(10) Patent No.: US 6,282,491 B1
(45) Date of Patent: Aug. 28, 2001

(54) TELEMATIC DEVICE FOR A MOTOR VEHICLE

(75) Inventors: Harald Bochmann, Hannover; Andreas Vahle, Hildesheim; Richard Aumayer, Diekholzen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,847

(22) PCT Filed: Sep. 30, 1997

(86) PCT No.: PCT/DE97/02238

§ 371 Date: Oct. 25, 1999

§ 102(e) Date: Oct. 25, 1999

(87) PCT Pub. No.: WO98/15075

PCT Pub. Date: Apr. 9, 1998

(30) Foreign Application Priority Data

Oct. 2, 1996 (DE) .............................. 196 40 735

(51) Int. Cl.⁷ .................................. G06F 165/00
(52) U.S. Cl. .................. 701/209; 701/208; 701/213; 342/357.09; 455/90
(58) Field of Search ............................ 701/207, 208, 701/209, 212, 213; 342/357.01, 357.02, 357.07, 463, 357.09; 455/404, 456, 90

(56) References Cited

U.S. PATENT DOCUMENTS 4,785,463 * 11/1988 Janc et al. ........................ 375/147
5,173,710 * 12/1992 Kelley et al. ...................... 342/463
5,218,618 * 6/1993 Sagey ............................... 375/130
5,223,844 * 6/1993 Mansell et al. ................ 342/357.07
5,422,816   6/1995 Sprague et al. .

FOREIGN PATENT DOCUMENTS 90 07 501    4/1992 (DE) .
43 22 288    1/1995 (DE) .
44 45 582    3/1996 (DE) .
WO 94 15412 7/1994 (WO) .

* cited by examiner

*Primary Examiner*—William A. Cuchlinski, Jr.
*Assistant Examiner*—Gertrude Arthur
(74) *Attorney, Agent, or Firm*—Kenyon & Kenyon

(57) ABSTRACT

A telematic device in which a car radio with an RDS module, a wireless telephone, and a positioning and navigation system are provided in one housing. The housing is designed so that it can be installed in a standard bay in the instrument panel of a motor vehicle. The telematic device can be used to receive general information via the car radio as well as specific information via the GSM module. In addition, data relating to, for example, the vehicle position, a desired destination, or an emergency call can be sent to the central station. The central station calculates one or more routes and transmits them back to the telematic device. In the event of an accident or a vehicle breakdown, an emergency call is transmitted and assistance obtained. Additional telematic services provided include an expanded anti-theft system for the motor vehicle, hotel reservations, etc.

14 Claims, 2 Drawing Sheets

TELEMATIC DEVICE FOR A MOTOR VEHICLE

BACKGROUND INFORMATION

The present invention relates to a telematic device for a motor vehicle. The term telematics, in particular traffic telematics, refers to systems that are used for communications, instrumentation and control, and information technology in the field of transportation. The control and display device described in German Patent No. 90 07 501 U1 can be regarded as a device of this type. In the case of this device, a navigation instrument is additionally built into the housing of a car radio, with navigation instructions being output on a display. A wireless telephone with a dialing keypad is connected to a communications port on this device, with the wireless telephone being positioned in a different location in the vehicle.

The many different types of communications equipment in use today in motor vehicles give rise to the problem that each device takes up a certain amount of space in the vehicle. The individual devices are frequently installed in the vehicle's trunk, which means that the full trunk capacity is no longer available. A further disadvantage is the fact that the individual devices must be connected via power supply lines and data or information lines. Aside from the many different types of lines needed, the devices also require a certain amount of additional assembly work, which can sometimes be quite complex. Because the vehicle power system is also subject to a great deal of radio interference due to the various control devices and power consumers, complicated interference suppression measures must additionally be provided for the individual pieces of communications equipment. Another problem is that each device has its own control logic, amplifier, input keys and displays, etc., making it difficult to use synergistic effects due to the inability to make multiple use of the individual components.

SUMMARY OF THE INVENTION

The telematic device according to the present invention has the advantage that the individual communications devices are provided in the same housing, with the dimensions of this housing being designed so that it can be installed in a bay provided for this purpose in the vehicle, for example in the car radio bay. This advantageously results in much less wiring, easier installation, and more reliable operation, due to less radio interference. One particular advantage is that the wireless telephone is equipped with a GSM module which can be used to transmit digitized data such as a location calculated with a GPS module, a desired destination, and text to a central station. The digitized transmission is highly resistant to disturbance, since noise signals and interference (fading) are largely suppressed. Through data exchange, the telematic device can thus control a wide variety of information such as route data, the traffic situation, and vehicle security. It can be produced relatively easily and economically in the form of a compact unit.

One particular advantage of the present invention is that the external central station can compute a route to a desired destination and transmit it to the vehicle device. The individual components, e.g., a CD-ROM drive with a digitized map and a sophisticated computation program do not have to be built into the telematic device installed in the vehicle. A further advantage is that the telematic device requires only a relatively small storage capacity to store the route transmitted by the central station and output it on the telematic device display.

Because the telematic device determines the instantaneous vehicle position, a specific partial area, preferably along the route, can be defined and the specific traffic situation in this area can be detected. Depending on the traffic situation, an alternative route is requested on the basis of the data available for this partial area, allowing the vehicle to move toward its destination with as few obstacles as possible.

Another advantage is that the GSM module can be used to transmit additional information from the central station to the vehicle device so that desired destinations, such as hotels, gas stations, parking lots, banks, etc. can be easily located.

The telematic device can also be advantageously used to protect against theft or misuse of the vehicle, because the telematic device allows the vehicle to be used only if the user has been adequately identified. If not, an emergency signal is automatically sent to the central station in the case of unauthorized vehicle use, so that the vehicle owner or the police can be notified directly if the vehicle is stolen.

In order to trace the vehicle more easily, authorization for a limited driving area or direct intervention in the engine management system can be provided, due to the fact that the vehicle position is always known. This makes it difficult to continue driving or flee with the vehicle.

Another particular advantage is that the telematic device can be used to make an emergency call to the central station in the event of an accident or vehicle breakdown, thus allowing the user to request assistance quickly.

Another advantageous application is to use the telematic device not only to reserve a parking place but also to pay the incurred fees with a debit card, for example a chip card or the like, so that the driver does not have to additionally stop and pay before leaving the parking lot.

The telematic device can be advantageously equipped with additional devices, for example a CD-ROM drive on which a digital map is stored. If the central station becomes overloaded, particularly in densely populated areas, the telematic device can calculate a route itself, based on the digital road map, which makes it independent of the route suggested by the central station.

DETAILED DESCRIPTION

Figure 1:
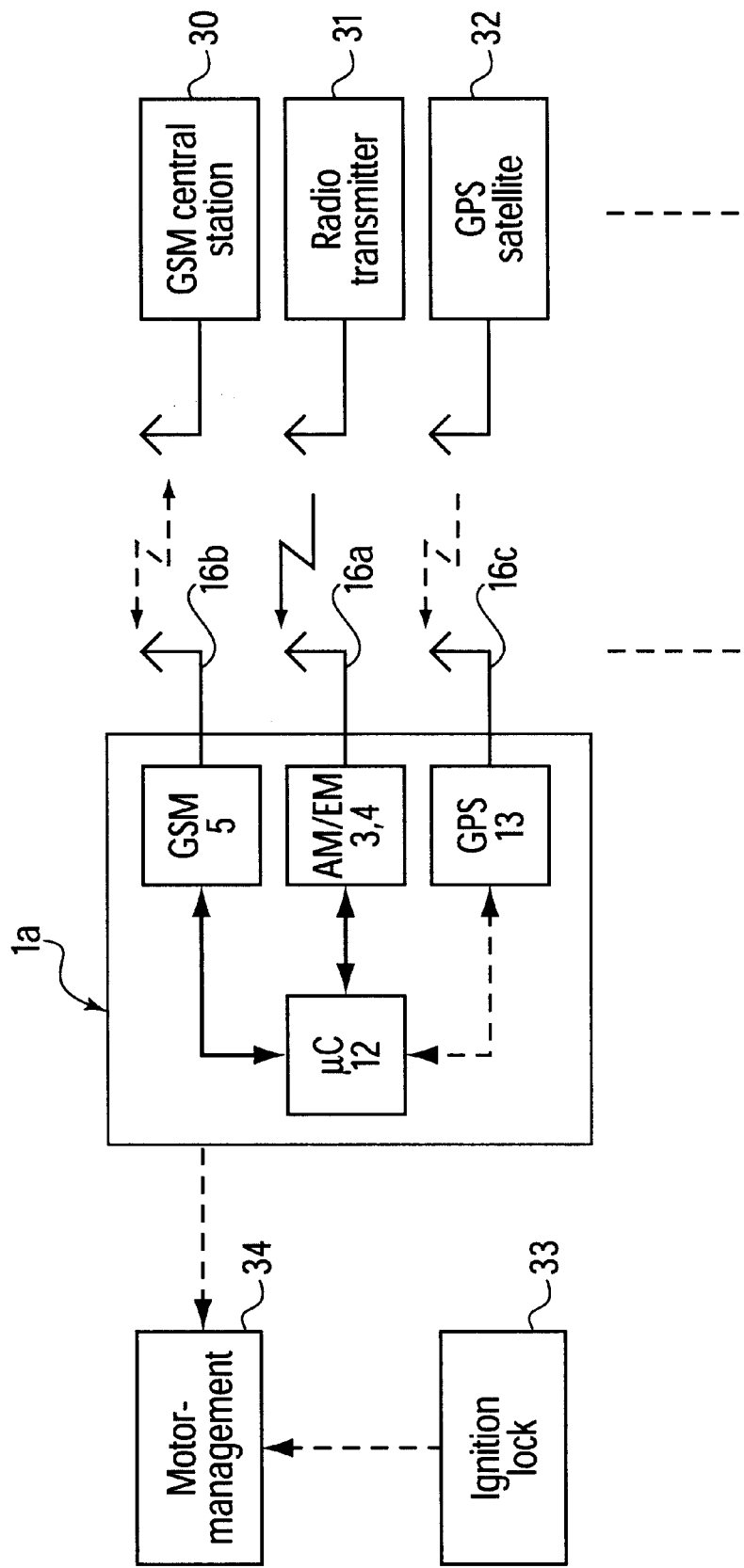
FIG. 1 shows a system layout in the form of a block diagram of a circuit arrangement according to the present invention.

FIG. 1 shows the system layout of the circuit arrangement according to the present invention. A telematic device includes a housing 1a designed preferably to have a car radio and amplifier 3, 4, a GSM (global system mobilization) module 5 for wireless services, and a GPS (global positioning system) module 13 for receiving signals from GPS satellites. These individual units have transmitting and receiving antennas 16a, b, c with corresponding inputs. The equipment is controlled by a centrally located telematic computer 12. The individual modules of the telematic device are designed so that they receive individual signals from a GSM station 30, radio transmitter 31, and GPS satellite 32. Furthermore, the telematic device can be provided with interfaces for at least one CAN (computer area network) bus and/or one further data bus to which, for example, engine management system 34 and/or ignition lock 33 of the motor vehicle can be connected. The telematic device can thus also influence engine management system 34, depending on the position of ignition lock 33.

Figure 2:
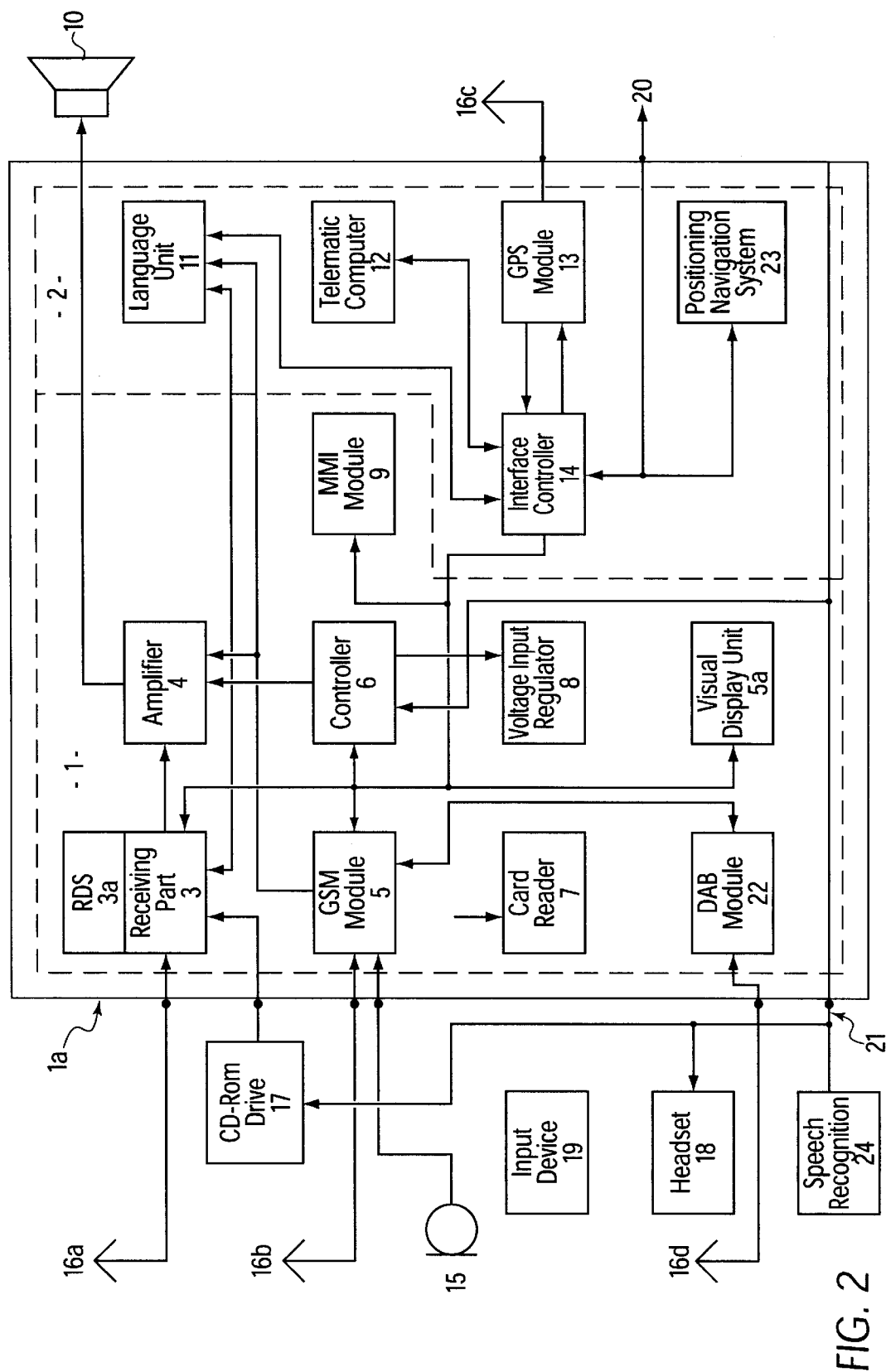
FIG. 2 shows a block diagram of a telematic device according to the present invention.

FIG. 2 shows a block diagram of the telematic device. The main modules described below are installed in a housing 1a. The dimensions of housing la are selected so that it can be preferably installed in the standard bay provided for installing a car radio in the instrument panel of a motor vehicle. According to the present invention, therefore, the individual modules are produced with compact and space-saving dimensions so that they can be properly installed in housing 1a. The installation bay can be equal to or twice the standard size.

For the most part, housing 1a contains a radio unit 1 and a telematic unit 2. Radio unit 1 generally has a car radio with a receiving part 3 and an amplifier 4. An RDS (radio data system) module 3a is attached to the receiving part 3. A radio antenna 16a can be plugged into receiving part 3 via a corresponding cable. One or more speakers 10 can be connected to the output of amplifier 4. Speaker 10 can be temporarily switched to microphone mode, so that speaker 10 can be used as a microphone, e.g., in wireless mode, in which case microphone 15 can be eliminated. A GSM module 5, to which a transmitting/receiving antenna 16b can be connected, is provided for wireless operation with an external central GSM station 30. In addition, a microphone 15 is also connected to GSM module 5 as an input device. GSM module 5 is also connected to a card reader 7 which can read a memory card such as a chip card, SIM (subscriber identity module) key card, a debit card, and the like. In addition to this, a DAB (digital audio broadcasting) module 22 is connected to GSM module 5. A DAB antenna 16d can be connected to DAB module 22. A controller 6 as well as voltage input regulators 8 and an MMI (man-machine interface) module 9 are provided for controlling individual modules. A visual display unit 5a, on which the input and received information can be displayed, is also connected to the controller.

Telematic unit 2 has a language unit 11 in which prerecorded word and sentence fragments are stored for a specific language. Language unit 11 can also be designed for additional word and sentence fragments. Language unit 11 is connected to an interface controller 14, which assembles the word and sentence fragments from the received RDS or GSM signals so that they can be output acoustically via amplifier 4 and speaker 10. In addition, a telematic computer 12 and a satellite module 13, preferably a GPS module, are connected to interface controller 14. GPS module 13 is connected to a GPS antenna 16c. Interface controller 14 is connected to controller 6, GSM module 5, MMI module 9, receiving part 3, and visual display unit 5a via an internal bus. Language unit 11 is also connected to receiving part 3. Interface controller 14 is designed with a CAN (computer area network) bus 20 to which a positioning and navigation system 23 can be connected. Positioning and navigation system 23 preferably has a storage device for a digital road map. A further data bus 21, for example an ASCII bus, is also provided, which is connected to controller 6. Both CAN bus 20 and further data bus 21 have suitable sockets on housing 1a so that additional devices can be connected.

For example, a CD-ROM drive 17, preferably a CD changer, an input device 19 with at least one key, a headset 18, and a speech recognition module 24 can be connected to further data bus 21. These additional modules are positioned in suitable locations within the motor vehicle. For example CD changer 17 can be positioned in the standard dual bay above the telematic device. Input device 19 is located on the front of the telematic device. Alternatively, input device 19 can be positioned in the vehicle so that it is mobile, with data being transmitted between input device 19 and the telematic device over a cable or through wireless means. Headset 18 and voice recognition module 24 can be arranged accordingly.

The operation of the telematic device is explained below by describing the individual modules and their functions. The telematic device has a compact design and performs all functions known to the individual known devices, such as a radio unit, car telephone, navigation instrument, and emergency calling device. The compact design and multiple use of identical modules advantageously provides a synergistic effect which allows for a compact construction and easy installation in the motor vehicle.

Car radio 3, 4 is provided for receiving VHF, MF, LF, and HF transmission and includes the RDS functions in connection with the TMC channel (traffic message channel). Four channels, for example, with speakers 10 can be connected to the output of amplifier 4. In addition, control elements or a cursor are provided for setting all other functions. A 10-disc CD changer, which is connected to a suitable input of car radio 3, 4 is preferably provided as CD-ROM 17.

The wireless telephone includes a GSM module 5, which is preferably activated by SIM cards. Card reader 7 is designed so that a large number of SIM card users can operate the device. Instead of a SIM (subscriber identity module) card or key switch, a default PIN permanently set in the factory can be used, or the PIN can be set automatically the first time a SIM card is inserted. An emergency call can be placed at any time to central station 30 via the GSM module 5 and a message to this effect can be output on visual display unit 5a. A speakerphone unit having adjustable ringer and handset volumes is also advantageous. An incoming short message (SMS: short message service) is announced by an audible signal and output on visual display unit 5a. In addition, the car radio 3, 4 is muted when a phone call is placed, and the volume of the car radio 3, 4 or an audio CD being played is gently returned to its previous setting at the end of the call. The SIM card has sufficient storage spaces for an adequate number of dialing addresses. When the SIM card is inserted into card reader 7, the speed-dial memory is output and the names are displayed on visual display unit 5a, sorted in alphabetical order. Calls can also be answered automatically or by pressing any key. In addition, all functions available on a feature phone, including the ability to display call charges, are provided. If the telematic device is connected to a data network, a voice mailbox or similar facility can also be selected.

Compared to a known driving lockout mechanism, the telematic device offers the advantage that a stolen vehicle automatically transmits its present position to central station 30, with the position being detected by satellite module 13 (GPS module). If an unauthorized person uses the vehicle, the theft function is automatic activated and an alarm is sent to central GSM station 30. A theft is detected by the fact that the vehicle leaves a driving area defined by the driver. After the vehicle leaves this area, the system intervenes in the motor management system 34 so that the vehicle can be driven only a short distance or not at all. To protect against manipulation, the allowed driving zone may also be stored in central GSM station 30. When central GSM station 30 receives a vehicle position that is outside the allowed driving zone, a theft alarm is automatically triggered. Further protection is provided by the fact that the vehicle is fully operational only when the anti-theft system is ready for operation and was not disturbed by manipulations to the transmitting antenna or a similar component. This mechanism is monitored by GSM module 5. If the GSM connection has been interfered with or interrupted, the vehicle's ability to move is blocked or restricted. Signals identifying the legal owner or authorized driver can cancel the restriction.

To prevent manipulation of the detected GPS position, the vehicle position can be controlled by positive feedback via wheel sensors or by evaluating tachometer pulses.

In a further embodiment of the present invention, a specific waiting time or a tolerance range must be set when the wireless telephone is experiencing poor transmission and receiving conditions. Mobility is not restricted while the vehicle moves within these preset boundaries, even if, for example, no satellite signals can be received.

Another telematic service provided is a breakdown call. If the car breaks down or is involved in an accident, GSM module 5 communicates with central GSM station 30, forwarding the breakdown call to a breakdown service. The vehicle's position, which is determined by GPS module 13 or positioning and navigation system 23, is transmitted along with the breakdown call. If the system 34 is connected to the engine management system via further data bus 21 or CAN bus 20, it is possible for example, to transmit an engine malfunction directly to the breakdown service so that a remote diagnosis can be made, if necessary. It is also possible to establish a data-only connection to the breakdown service, since a lower rate applies to such calls. A combined voice and data connection is also conceivable. The breakdown service can be provided by pressing a button or entering an identification number on a breakdown call chip card. Vehicle-specific data (type, vehicle ID number, driver data), the vehicle's position, and the time are transmitted along with the breakdown call. The emergency road service responds with an optical and/or acoustic signal, which can be output to visual display unit 5a or speaker 10. An emergency call is placed in a similar manner. However, additional information can be transmitted, such as the number of people involved in the accident, the type of injuries sustained, information about hazardous materials or other dangerous situations.

A further telematic service provided is a navigation assistant. The navigation assistant helps the driver locate a destination and calculate a route. The amount of work that the telematic device must perform is minimized, since the route is computed and the driver is guided to the destination from the central GSM station, 30 which transmits one or more suitable routes to the device installed in the vehicle. Because central GSM station 30 also knows the present traffic situation in the driving area along the target route, based on the RDS/TMC information received, central GSM station 30 can calculate a suitable route and transmit it to the telematic device in the vehicle. GSM module 5 is needed in this case as well for setting up the connection. To reach a specific destination, the vehicle driver enters a desired destination, for example, using a keyboard of input device 19 or headset 18. Alternatively, the desired destination can be decoded by a speech recognition module 24 and transmitted to central GSM station 30 via GSM module 5. The data is transmitted on the more economical data channel. After calculating the route, central GSM station 30 sends either a segment of the road map and/or driving instructions back to the telematic device. Because a DAB module 22 is provided an adequate bandwidth is available even for transmitting images without errors. The DAB module 22 is known per se and therefore does not need to be explained in greater detail.

Because the telematic device has a GPS module 13 or, for more accurate positioning, a DGPS (differential global positioning system) module, it is sufficient for central GSM station 30 to transmit individual reference points for the calculated route. Based on the known vehicle position, the telematic device then calculates the distance and directions to the next reference point on the route, continuing step-by-step until the desired destination is reached. The distance and directions to the next reference point and to the destination are advantageously output on visual display unit 5a. In addition to this, the information can be output acoustically via speaker 10 using language unit 11. If multiple reference points lie within the tolerance range of the GPS positioning system, all route recommendations relating to these reference points are output sequentially. Deviations from the route are signaled and the directions and distance to the next reference point are also displayed. If the present traffic situation changes, central station 30 automatically recomputes the route, taking into account the vehicle's present position, and transmits it to the telematic device.

For route calculation purposes, the telematic device can be designed to be very economical, and does not require a large buffer for the route. The GSM connection is needed only temporarily for transmitting the destination data and for transmitting the calculated route to the telematic device. By evaluating the RDS/TMC data, the telematic device can automatically select the route, circumventing an existing traffic jam.

Under certain circumstances (data protection, storage volume, cost), it may be necessary for central GSM station 30 to avoid storing all routes in a receiving area. In this case, the telematic device is equipped with a positioning and navigation system 23 and contains a CD-ROM for a digital map. CD changer 17 can be used as the CD-ROM. Using position sensors, e.g., wheel sensors, a direction sensor and/or GPS module 13, the vehicle position is fed back directly and output on a digital map on visual display unit 5a. The present position is sent to central GSM station 30 via GSM module 5 so that the central GSM station 30 can compute the route, taking the present traffic situation into account. Central GSM station 30 then sends the computed route to the telematic device so that it can be displayed on the digital map on visual display unit 5a. If the vehicle also has an independent positioning and navigation device, the positioning and navigation system according to a further embodiment of the present invention can compute an optimum route, taking into account the present traffic situation received selectively via the RDS/TMC channel.

If, for example, a parking lot is specified as the desired destination, the navigation assistant described above can guide the driver to the parking lot or a similar destination (workshop, gas station, bank, supermarket, etc.). With the aid of GSM module 5, the driver can also reserve a parking place. Card reader 7 can be used to automatically debit parking fees. Because the present traffic situation is stored in car radio 3, the TIM (traffic information message) function can be used to activate this information and output it visually or acoustically.

In a further embodiment of the present invention, GSM module 5 can be used to receive and evaluate general information. For example, tourist information, hotels, gas stations, parking lots, etc can be retrieved selectively from the central GSM station 30 for the destination or target area. A suitable menu allows the user to select a hotel, for example, from the image displayed on visual display unit 5a and make a reservation at the press of a button, using GSM module 5.

In conclusion, note that the construction of the individual modules is known per se and therefore does not need to be described in greater detail.

What is claimed is:

1. A telematic device for a motor vehicle, comprising:
 a housing including:
  a plurality of antenna connections,
  a car radio including an RDS module and in communication with a first one of the plurality of antenna connections,
  a positioning system including a satellite receiving module corresponding to a GPS module and in communication with a second one of the plurality of antenna connections,
  a wireless telephone including a digital radio service module corresponding to a GSM module and in communication with a third one of the plurality of antenna connections,
  a language unit in communication with at least one of the car radio, the positioning system, and the wireless telephone,
  a plurality of interfaces for connection with at least one of a CAN bus and a further data bus, and
  a plurality of interfaces for connection with at least one of at least one speaker and a microphone;
 a storage device coupled to the housing; and
 a display coupled to the housing, the housing having a design such that the housing is installable in a standard bay of the motor vehicle.

2. The telematic device according to claim 1, further comprising:
 a navigation system included in the housing and for determining a position of the motor vehicle; and
 an input device for providing the position of the motor vehicle and an entered destination to the GSM module, wherein:
  the GSM module provides the position of the motor vehicle and the entered destination to a central station, and
  the central station computes a route for the motor vehicle.

3. The telematic device according to claim 2, wherein:
 the storage device stores the computed route, and
 the computed route takes into account a present traffic situation.

4. The telematic device according to claim 3, further comprising:
 an arrangement for selecting an information corresponding to the present traffic situation relating to a preset partial area received via one of the GSM module and the RDS module and based on the position of the motor vehicle and the computed route, wherein the display provides the selected information according to at least one of a visual presentation and an acoustic presentation.

5. The telematic device according to claim 2, further comprising:
 an arrangement for retrieving from the central station via the GSM module general information relating to at least one of a hotel, a gas station, a parking lot, and a bank.

6. The telematic device according to claim 2, further comprising:
 a card reader for performing an identification operation and for reporting an unauthorized use of the motor vehicle to the central station via the GSM module.

7. The telematic device according to claim 6, further comprising:
 an arrangement for transmitting a signal to the central station when the motor vehicle exits a preset driving area, wherein the transmitted signal is based on the position of the motor vehicle at a specific point in time.

8. The telematic device according to claim 7, further comprising:
 an arrangement for intervening in an engine management system of the motor vehicle.

9. The telematic device according to claim 2, further comprising:
 a read/write device for a debit card corresponding to a chip card, wherein the read/write device causes the central station to automatically debit an incurred fee from the debit card in response to a request of a driver.

10. The telematic device according to claim 1, wherein the storage device stores a digital map and corresponds to a position sensor.

11. The telematic device according to claim 1, further comprising:
 a DAB module arranged in the housing.

12. The telematic device according to claim 1, further comprising:
 a navigation module coupled to one of the CAN bus and the further data bus.

13. The telematic device according to claim 1, wherein the at least one speaker is used temporarily as the microphone.

14. The telematic device according to claim 1, wherein:
 at least one of prerecorded word fragments and prerecorded sentence fragments are stored in the language unit.

* * * * *